United States Patent [19]

Herman et al.

[11] 4,391,928

[45] Jul. 5, 1983

[54] OPACIFYING POLYMERIC PARTICLE AND USES

[75] Inventors: Daniel F. Herman, Princeton; Uno Kruse, East Windsor, both of N.J.

[73] Assignee: NL Industries, Inc., New York, N.Y.

[21] Appl. No.: 299,360

[22] Filed: Sep. 4, 1981

[51] Int. Cl.³ .............................................. C08L 9/08
[52] U.S. Cl. ................................... 523/201; 525/902
[58] Field of Search ............... 525/902; 260/29.6 RB; 523/201

[56] References Cited

U.S. PATENT DOCUMENTS

| | | | |
|---|---|---|---|
| 3,423,351 | 1/1969 | Pierce et al. | 260/29.6 MQ |
| 3,787,522 | 1/1974 | Dickie et al. | 525/902 |
| 3,914,338 | 10/1975 | Krieg et al. | 525/902 |
| 4,069,186 | 1/1978 | Ramig | 260/29.6 RB |

*Primary Examiner*—Joseph L. Schofer
*Assistant Examiner*—N. Sarofim

[57] ABSTRACT

Opacifying and film-forming particles consisting of discrete capsules, each having a solid polymeric shell and a solid polymeric core and having a weight ratio of shell to capsule ranging from 0.25:1 to 0.5:1. The capsules are capable of providing a high degree of opacity and good film integrity in paint compositions in replacement for pigments in binding agents.

16 Claims, No Drawings

OPACIFYING POLYMERIC PARTICLE AND USES

This invention relates to an organic particle opacifier and an opacified latex dispersion paint composition. More particularly, this invention relates to a capsular opacifier product useful in latex paint compositions having a solid hard core and a solid soft shell useful for replacing both inorganic pigments and film-forming agents and a paint composition containing same.

1. Settting of the Invention

A desirable latex paint composition combines a pigment or air void to provide opacity characteristics with a binding agent which provides for film continuity to protect and hide an underlying surface.

Various inorganic pigment particles such as titanium dioxide, barium sulfate and calcium carbonate have been conventionally utilized in paint compositions. Inorganic primary pigment particles such as titanium dioxide have an exceptionally high opacifying effect which is derived from high light scattering coefficient which is a consequence of its particle size and a high index of refraction.

Alternatively, the dried paint film may contain air voids of particular sizes which contribute to scattering the light and aid the latex film to achieve the required opacity.

Standard latex binders are composed of polymers which are readily deformable under drying conditions. The binder alone yields clear continuous films from which air is excluded. The resulting films have no porosity which is a desirable characteristic from the point of view of film integrity and mechanical properties. The unrestricted flow of latex particles eliminates the spaces originally formed between the particles as they first come in contact with each other. Upon evaporation of the water coalescence takes place and light scattering air voids are absent from the film.

2. Prior Art

Pertinent publications include U.S. Pat. No. 3,839,064 issued to D. M. Vincent on Oct. 1, 1974 entitled "Inorganic Pigment Loaded Polymeric Microcapsular System". This patent discloses opacifying pigment particles having a solid polymeric core and a solid polymeric shell. The core contains an inorganic pigment which includes titanium dioxide. The shell material is grafted to the core. The material of the core includes polystyrene, polyvinylchloride, polyacrylate, polyacrylic esters and similar materials. The shell is disclosed as a hydroxylated polymer which may be cross-linked by suitable cross-linking agents, such as formaldehyde condensation products. The microcapsules must have an average particle diameter of below 2 microns for paint compositions having high glossiness and between 2 and 50 microns for paints having high opacity glare-free films.

An additional publication includes U.S. Pat. No. 3,661,994 issued to J. C. H. Hwa et al, May 9, 1972 entitled "Graft Polymer of Rubber for Reinforcing Plastics." This publication discloses a multi-layered plastic useful for reinforcing rigid plastics having a hard polymeric core, a coating of rubber and if desired, one or more hard outer polymeric coatings. The core materials include any polymer or copolymer having a glass transition ($T_g$) above 25° C. The rubber layer materials include any polymer or copolymer having a $T_g$ less than about 25° C. The preferred percentage of rubber to total weight is between 10 to 97% and the size of the particles ranges from 0.25 to 2 microns.

Pertinent publications also include U.S. Pat. No. 4,069,186, issued to Ramig on Jan. 17, 1978 for "Opacified Latex Paint Containing Plastic Polymer Particles." In Ramig, a paint dispersion composition is disclosed containing a binder made up of a major weight of polymer particles not smaller than about 10 microns and non-film forming plastic particles having a weighted average particle size diameter between about 10 microns and 100 microns. The film produced has required opacity but lacks film integrity.

Also of interest is an article by M. S. El Aasser, S. Iqbal and J. W. Vanderhoff, *Colloid and Interfacial Science*, Vol. V., page 381, which discloses preparation of model microvoids by use of monodisperse polystyrene particles which have been coated with thin shells (up to 13.7 wt%) of a soft sticky polymer, polyethyl acrylate. No use in latex paint composition is disclosed since the film formed with the particles has very poor integrity.

SUMMARY OF THE INVENTION

It has now been found that an organic capsular system which acts as an excellent opacifier in addition to good film-forming characteristics can be provided. The pigment content and the conventional film-forming agent content of a paint composition may be reduced while the hiding power and the film-forming characteristics of the composition are retained. The capsular system of this invention comprises: an opacifying organic particle comprising discrete capsules comprising a solid polymeric core surrounded by a solid polymeric shell. The weight ratio of said shell to total weight of capsule ranges from 0.25:1 to 0.5:1.

By loading solid organic capsules of this invention in a coating composition, having the following composition: titanium dioxide, conventional binder, extender, conventional surfactants, dispersants, coalescing agents, mildewcides and viscosifiers, the hiding power and the film-forming characteristics of the composition may be maintained with a substantial decrease in the use of pigment and film-forming agents.

DETAILED DESCRIPTION OF THE INVENTION

The capsular system of the present invention is provided by forming capsules having a polymeric core surrounded by a solid polymeric shell by conventional methods. Suitable means of microencapsulation are described below, employed as disclosed in U.S. Pat. Nos. 3,418,656 and 3,418,250 which are incorporated herein by reference. The polymeric core is made without any inorganic pigments.

Any polymeric material which is capable of being encapsulated in a capsular system may be employed as a core in the present invention. A suitable material should have a $T_g$ glass transition temperature, greater than about 80° C. Monomeric materials which may be used include ethylenically unsaturated monomers, for example acrylic esters, such as methyl methacrylate, butyl methacrylate, isopropyl methacrylate, as well as other vinyl polymers such as vinylidene chloride, styrene, divinyl benzene, acrylonitrile, vinyl chloride, alone or mixtures thereof, provide the desired properties. Preferred polymeric core materials are polystyrene, polyvinyl chloride, and polymethyl methacrylate. The core may also be formed of a crosslinked polymeric material having a $T_g$ greater than about 70° C. More preferred core material is polystyrene due to the ease of manufacture of monodisperse particles and low cost.

A variety of materials can be used to form the shell of the capsular system of the present invention. Suitable materials include those organic polymeric materials having a $T_g$ less than about 45° C. Preferred polymeric materials for the shell include polymers such as copolymers derived from methyl acrylate, butyl acrylate, ethyl hexyl acrylate, hydroxy ethyl methacrylate, methacrylic acid and acrylic acid, styrene, vinyl acetate and mixtures thereof used in such proportions to give $T_g$ less than 45° C.

The size of the particle core is important to the application as a replacement for pigments since the control of the light scattering voids is critical for opacity. In particular for replacement of titanium dioxide, the particle size of the core should range from about 0.3 to 1 micron. Preferably, the size should range from about 0.4 to 0.8 micron. The 0.4 to 0.8 micron particle core range is preferred since the contrast ratios obtained from paint composition for particle cores below 0.4 micron and losses on stain obtained for particle cores above at the 0.8 micron are less than desirable. Also preferably, the particles are monodisperse, i.e. having a narrow particle size distribution. More preferably, the standard size deviation is less than about 5%. More preferably, the diameter of the particle cores is about 0.6 micron.

The weight ratio of shell to particle is also important. Preferably the ratio should range from 0.25:1 to 0.50:1. More preferably, the ratio should range from 0.40:1 to 0.45:1.

The particles of this invention are particularly useful in a latex paint composition which is similar in opacity and film characteristics to a first composition containing primary pigment such as $TiO_2$ and binding agent. In particular, to form the paint composition from the first composition where x is weight in pounds of pigment in the first composition; x' is weight difference in pounds of pigment between the first composition and the paint composition; y is weight in pounds of binder in the first composition; y' is weight difference in pounds of binder between the first composition and the paint composition; z is weight in pounds of the particles of this invention in the new composition; x' should range from about 0.1x to about 0.5x; y' should range from about 0.1y to about 0.6y; z should range from about $0.3(x'+y')$ to about $0.9(x'+y')$. Preferably x' ranges from about 0.2x to about 0.4x, y' ranges from about 0.2y to about 0.5y and z is about $0.5(x'+y')$.

The particles of this invention may be incorporated into an aqueous latex dispersion paint composition which forms at ambient temperatures into a hardened paint film, the latex paint having about 40% to 70% by weight total solids comprising on a dry solids weight basis:

a. from about 10%–25% of a film forming latex binder, b. from about 2%–25% of an opacifying organic particle comprising discrete capsules comprising a solid polymeric core surrounded by a solid polymeric shell, the weight ratio of said shell to total weight of particle ranges from 0.25:1 to 0.5:1, c. from about 15 to 40% opacifying pigment having a refractive index of at least about 1.8, and d. from about 0 to 70% of extender pigment having refractive index below about 1.5.

The composition should form a film upon drying, which contains voids and the voids should range from about 0.2 to about 0.5 micron in size.

Polymerization techniques which will lead to the monodispersity include those techniques as described in publications of M. E. Woods, J. S. Dodge and I. M. Krueger, *J. Paint Technology* 40, 541 1968. The preparation of a controlled monodisperse methyl methacrylate latex is described by H. Ono and H. Sacki, *Colloid and Polymer Science* 253, 744 (1975). Methods described by Woods et al have been of particular use in the preparation of the hard styrene cores of this invention. Mixtures of anionic and nonionic surfactants used in emulsion polymerization produce highly uniform particle-size latices in sizes ranging up to about 0.5 micron. The specific size produced is controlled by type, concentration and ratio of the anionic to nonionic surfactants employed. Particle sizes of less than 0.1 micron are to be avoided. Particle sizes of 0.4 micron range or larger are formed using an anionic surfactant such as sodium lauryl sulfate at low levels. Nonionic surfactant is added to stabilize the emulsion. The low level of anionic surfactant insures that a relatively small number of micelles is first formed. The propagation step then takes over during which each micelle grows as monomer molecules enter and are polymerized. During the propagation, the smaller particles because of their higher surface volume ratio, grow at a faster rate than the larger particles, thus narrowing the particle size distribution. Control over the particle size may be achieved by careful selection and balance of the absolute and relative concentrations of the anionic and nonionic surfactants. Increasing the concentration of the anionic surfactant will decrease the particle size. Addition of a nonionic surfactant leads to an increase in particle size. In the case of polystyrene, particle sizes of from 0.2 micron to about 0.6 micron can be produced by nonionic and anionic surfactant ratio of between about 5:1 to 40:1.

Reactions may be carried out either batchwise or semi-batchwise, the former being satisfactory for preparation of small quantities. However, since semi-batch leads to better control of the exotherm, and since it yields narrower particle size distribution, it is preferred.

In the semi-batch technique, styrene monomer, water, catalyst and surfactant are preemulsified and deaerated following which a small portion, about 1/7 of the batch, is introduced into a reactor. The reaction is initiated by heating to about 70° C. and the exothermic reaction is allowed to run its course. The remainder of the batch is then metered over a period of 2 to 4 hours at such a rate that the monomer is consumed as it is added. The polymerizing system is then starved of the monomer and there is no longer any danger of uncontrolled exothermic reaction.

When hard styrene cores greater than 0.5 are desired, the above method is no longer satisfactory, since the polymerization system becomes unstable if the concentration of the anionic surfactant is reduced to a level necessary to produce the larger cores. A technique of seeded polymerization is used instead. The seeds ranging in size from 0.2 to 0.4 micron are produced using the surfactant system described above. A calculated amount of fresh styrene monomer, surfactant and water is metered into the preformed seed latex. According to known techniques, the amount is carefully calculated to enlarge the original seed diameter to the desired new particle dimension and to restrict the locus of the reaction to the original latex particles. Such techniques are illustrated in J. M. Dodge, M. E. Woods and I. N. Knight, Journal of Paint Technology, 42, No. 541, 1970. An amount of anionic surfactant in excess of amount required to saturate the surface of the polymer seed will tend to form new micelles from which new particles can grow. An insufficient concentration of surfactant will result in poor stability of the final polymerization latex. A third method of enlarging polystyrene seeds is to pretreat an initiator free polystyrene emulsion with fresh monomer which is absorbed in the seed to yield monomer swollen particles of desired dimension. This is followed by the introduction of catalyst and polymerization. Although this method is satisfactory it tends to result in slower polymerization and somewhat broader range of particle sizes.

Catalysts used for formation of cores include conventional water soluble types such as sodium, potassium and ammonium persulfates and redox systems consisting of persulfates and bisulfites.

Anionic surfactants useful in the polymerization include sodium lauryl sulfate, sodium dodecylbenzene sulfonate and useful nonionics include polyoxyethylene ether derivatives of alkyl aryl phenols. Useful combinations of surfactants include sodium lauryl sulfate and a polyoxyethylene isooctylphenyl ether.

Solid contents of over 40% can be prepared and stable latexes produced. The upper practical limit of particle size is about 0.8 micron.

The shells are formed on the surface of the hard polymer cores by initiating the final polymerization stage of the shell-forming monomers in the presence of preformed core particles. This may be carried out with or without additional surfactants.

Stable shell-core latices may be formed at final latex solids concentration between 15 to 25% without added surfactants. At final solids concentration above 40%, addition of a mixture of anionic and nonionic surfactants is necessary. A suitable surfactant combination is sodium lauryl sulfate and sodium alkylaryl polyether sulfonate. A preferred manner of conducting the polymerization is to charge a latex of hard polymer cores to the reactor, deaerate and heat to 70° C., then meter into the reactor, shell forming monomers simultaneously with an aqueous solution of catalyst and surfactant. A useful catalyst is the redox combination of ammonium persulfate and sodium bisulfite. Shell formation is illustrated by Masayoski et al, *Journal Polymer Science*, Polymer Chemistry Edition, Vol. 16, 3219 (1980).

EXAMPLE 1

1200 gm of distilled water, 25 gm of Triton X-100 nonionic surfactant (Rohm & Haas), and 2.5 gm sodium lauryl sulfonate anionic surfactant are charged into a 4-liter beaker. The solution is agitated rapidly while a mixture of 776 gm of styrene monomer and 24 gm of hydroxy ethyl methacrylate is passed into the solution. The rapid agitation is continued for ten minutes to form a stable emulsion. 4 gm. of potassium persulfate and 3 gm of sodium bicarbonate are added to the emulsion and the emulsion is transferred to a 3-liter flask. The emulsion is then deaerated and heated to 80° C. It is then allowed to react for two hours with cooling as necessary to maintain the temperature of the mixture below 85° C. After 2 hours, there was no styrene odor and the latex was cooled and filtered through glass wool. The resulting product contained 40% solids, and the latex particles had an average particle diameter of 0.287 micron.

EXAMPLE 2

1225.3 gm distilled water was added to a 3-liter flask containing 187 gm of the product mixture produced in Example 1, 2 gm. Aerosol MA-80 surfactant, 2 gm. potassium persulfate and 2 grams sodium bicarbonate. The solution was deaerated and heated to 80° C. 587.7 gm. of styrene monomer was then added over a 2 hour period. The mixture was allowed to react for one hour, cooled and filtered through glass wool. The product contained 32.6 percent solids and the particles were 0.6 micron in diameter and monodisperse. The film of the latex may be drawn on a surface and dried. The film will be white but will disintegrate upon touch.

EXAMPLE 3

305 gm (122 gm of solids) of the product of Example 2 was added to a 3-liter flask containing 633 gm distilled water and 2.5 gm sodium salt of a short chain vinyl sulfonate (manufactured by Alcolac, Inc.). The solution was deaerated. Catalyst solution of 60 gm distilled water, 0.5 gm potassium persulfate, and 0.5 gm sodium bisulfite was prepared. A monomer solution of 74 gm ethyl acrylate, 25 gm methyl methacrylate, and 1 gm methacrylic acid was prepared and deaerated. The solution contained in the flask was heated to 70° C. and ¼ of the catalyst solution was added. The monomer solution was metered in over a 2-hour period and ¼ of the catalyst solution was added each ½ hour. The mixture was reacted for one hour at 70° C., cooled, and filtered through the glass wool. Solid content of the resultant mixture was 17%. The solution was concentrated under a rotational vacuum and contained 40.7% solids. The particles produced has a weight ratio of shell to particle of 0.45:1.

EXAMPLE 4

1463.4 gm. of the 0.6 micron polystyrene core latex of Example 2 were added to a 3-liter flask containing 116.6 gm distilled water. A catalyst/surfactant solution of 115 gm distilled water, 8 gm Triton X-200 surfactant, 4 gm sodium lauryl sulfate surfactant, 1.6 gm ammonium persulfate catalyst and 1.6 gm sodium bisulfite catalyst was prepared and deaerated. A monomer solution of 235.2 gm butyl acrylate and 156.8 gm methyl methacrylate was prepared and deaerated. The flask containing the polystyrene latex was heated to 70° C. and the monomer solution and catalyst/surfactant solution were continuously metered in over a 2 hour period. The mixture was reacted for two hours at 70° C., cooled and filtered through glass wool. The particles produced had a weight ratio of shell to particle of 0.45:1.

EXAMPLE 5

1463.4 gm of the 0.6 micron polystyrene latex produced in Example 2 was added to a 3-liter flask containing 116.6 gm of distilled water. The solution was deaerated. A catalyst/surfactant solution consisting of 150 gm of distilled water, 8 gm Triton X-200 surfactant, 4 gm. sodium lauryl sulfate surfactant, 1.6 gm of ammonium persulfate catalyst and 1.6 gm of sodium bisulfite catalyst was prepared and deaerated. A monomer solution of 274.4 gm of ethyl acrylate and 117.6 gm of styrene was prepared and deaerated. The flask containing the polystyrene latex was heated to 70° C. and both the monomer solution and the catalyst/surfactant solution were metered continuously into the flask over a 2-hour period. The mixture was then reacted for two hours at 70° C. and cooled. The cooled mixture was then filtered through glass wool and the shell to particle weight percent was 45%.

EXAMPLE 6

The procedure of Example 5 was followed with the exception that the monomer solution consisted of 235.2 gm ethyl acrylate, 149 gm of styrene and 7.8 gm hydroxyethyl methacrylate. The shell of the particle weighed 45% of the total weight of the particle. The film may be drawn from the latex and, upon drying, will be white, tough and elastic.

EXAMPLE 7

A conventional paint formula base was prepared consisting of a pre-mix (A), a grind (B) and a let-down (C) as shown in Table 1 below.

TABLE 1

| | #/100 gals. |
|---|---|
| A. | |
| Water | 335.8 |
| Neutralizer - Conc. NH₄OH (28% NH₃) | 2.0 |
| Fungicide - 32% di(phenylmercuric) dodecenylsuccinate (Super Ad-It-Tenneco) | 0.9 |
| Thickener - Hydroxyethyl cellulose (Cellosize QP-4400 - Union Carbide) | 5.0 |
| B. | |
| Dispersant - Potassium tripolyphosphate KTPP | 1.0 |
| Coalescing Aid - Propylene Glycol | 18.0 |
| Coalescing Aid - Ethylene Glycol | 10.0 |
| Defoamer - High boiling mineral oil & silica | 1.0 |
| Surfactant-alkylaryl polyether alcohol (Triton N-101, Rohm Haas) | 3.1 |
| Dispersant - 25% sodium salt of polymeric carboxylic acid (Tamol 732 - Rohm & Haas) | 6.0 |
| Extender Pigment - Calcium carbonate (Optiwhite) | 150.0 |
| Extender Pigment - Silica (Lorite) | 100.0 |
| Pigment - Titanium dioxide (Titanox 2020 - NL Industries) | 190.0 |
| C. | |
| Coalescing Aid - Mixed Alcohols (Texanol - Eastman) | 12.0 |
| Defoamer Aid - Colloid 585 | 4.5 |
| Binder - (UCAR 366 - 55% solids - Union Carbide) | 310.0 |
| TOTAL | 1149.2 |

EXAMPLE 8-12

Example 8 was prepared using the paint formulation of Example 7. Examples 8, 9, 10, 11, 12 were prepared using the control point formulation of Example 7 except that varying amounts of TiO₂ were substituted in place of the amount used in the control formulation. The formulations were painted onto a surface and the films were air dried at room temperature (72° F.) for at least 16 hours before the following measurements were made. Opacity is measured on a 3 mil wet film applied to Lenata Form 3B chart (ASTM D2805-70) and dried at 72° F. for 16 hours wherein reflectance is measured over black and white portions of the chart using a Color Eye spectrophotometer to provide a contrast ratio reported as the ratio of reflectance over black to reflectance over white. Surface porosity was measured by K&N ink holdout (ASTM D3258-73) wherein a 3 mil wet film of test paint was drawn down on a 2C Lenata opacity chart by a 3 mil Bird applicator and air dried for 16 hours. K&N ink is then cast at right angles to the test paint over the white portions of the 2C chart and allowed to stand for two minutes. Excess ink is thereafter washed off with mineral spirits. Penetration of ink into the test film is then measured by reading percent reflectance on the Y scale of an IDL Color Eye colorimeter spectrophotometer (Instrument Development Labs, Koll-Morgan Corp.) using a white vitrolite standard. Porosity is indicated by loss in percent reflectance. Similar paint films of 3 mils wet and dried at 75° F. for 16 hours were subject to abrasion resistance (ASTM D2486-79). The results are presented in Table 2 below.

TABLE 2

| | Additions Pounds/100 Gallons | | | Properties | | |
|---|---|---|---|---|---|---|
| Example | TiO₂ | Binder | Particles | 3 mil CR | K&N Stain % Loss | Scrub Cycles |
| 8 | 190 | 170 | 0 | 0.980 | 25.9 | 265 |
| 9 | 170 | 170 | 0 | 0.979 | 25.0 | 259 |
| 10 | 150 | 170 | 0 | 0.975 | 22.1 | 395 |
| 11 | 130 | 170 | 0 | 0.970 | 20.0 | 311 |
| 12 | 110 | 170 | 0 | 0.954 | 19.5 | 400+ |

Example 8 is considered the control paint for Example 9 through 36 which follow. The results presented in Table 2 and subsequent tables should be compared to this Example 8. The decrease in pigment reduces the hiding power such that Examples 11 and 12 would be unacceptable and Example 10 only fair. Since the binder % composition increased, the stain loss and scrub cycles improved correspondingly.

EXAMPLE 13-16

Example 13 through 16 were prepared using the control paint formulation of Example 7 except that the amount pigment was reduced and a corresponding amount of particle were substituted. The formulations were painted on a surface and the same tests as in Example 8-12 were performed. The results are presented in Table 3 below.

TABLE 3

| | Additions Pounds/100 Gallons | | | Properties | | |
|---|---|---|---|---|---|---|
| Example | TiO₂ | Binder | Particles | 3 mil CR | K&N Stain % Loss | Scrub Cycles |
| 13 | 170 | 170 | 20 | 0.978 | 22.9 | 268 |
| 14 | 150 | 170 | 40 | 0.966 | 21.0 | 456 |
| 15 | 130 | 170 | 60 | 0.959 | 14.0 | 510 |
| 16 | 110 | 170 | 80 | 0.941 | 15.6 | 500 |

Example 13 maintained good opacity, however, Examples 14-16 failed. All Examples showed very good film characteristics.

EXAMPLES 17-20

Examples 17-20 were prepared using the control paint formulation of Example 7 except that varying amounts binder and pigment were replaced by amounts of particles. The formulation was painted on a surface and tested as in Example 8. The results are presented in Table 4 below.

TABLE 4

| Example | Additions Pounds/100 Gallons | | | Properties | | |
|---|---|---|---|---|---|---|
| | TiO₂ | Binder | Particles | 3 mil CR | K&N Stain % Loss | Scrub Cycles |
| 17 | 170 | 150 | 20 | 0.980 | 31.1 | 281 |
| 18 | 150 | 130 | 40 | 0.979 | 34.0 | 199 |
| 19 | 130 | 110 | 60 | 0.979 | 35.4 | 165 |
| 20 | 110 | 90 | 80 | 0.979 | 37.9 | 178 |

Examples 17 through 20 have very good hiding power and acceptable film characteristics.

EXAMPLES 21 AND 22

The procedure of Example 8 is followed for Example 21 with the exception that the particle produced in Example 4 are used instead of the particle produced in Example 6. Example 22 uses the same procedure as Example 8 except that the particle produced in Example 2 was used instead of that of Example 6. The formulation was painted on a surface and tested as in Example 8. The results obtained are shown in Table 3 below.

TABLE 5

| Example | Additions Pounds/100 Gallons | | | | Properties | | |
|---|---|---|---|---|---|---|---|
| | TiO₂ | Binder | Particles | Styrene Core | 3 mil CR | K&N Stain % Loss | Scrub Cycles |
| 21 | 110 | 60 | 60 | — | 0.972 | 35.9 | 156 |
| 22 | 110 | 60 | — | 60 | 0.976 | 41.7 | 114 |

Although the styrene core paricles of Example 22 contribute essentially equivalent hiding characteristics of Example 8, results of the stain test and the scrub test show that the uncoated styrene core does not contribute suitable film forming characteristics to compare with Example 8 or Example 21.

EXAMPLE 23-28

0.6 micron polystyrene cores of Example 2 were encapsulated in a shell of 74% ethyl acrylate, 25% methyl acrylate, and 1% methacrylic acid according to the procedure of Example 3 to varying shell to particle weight percent listed in Table 6 below. A paint composition of Example 7 was prepared except that a portion of the pigment and binder was removed and replaced with the above prepared particles. The paint formulation contained 110 pounds titanium dioxide, 110.5 pounds binder (UCAR 366 100% solids basis) and 60 pounds of particles per 100 gallons. The weight percent of shell varied from 25% to 50%.

The paint was applied to a test surface and tested for 3 mil contrast ratios, KN percent loss in reflectance and scrub values. The results are shown in Table 6.

TABLE 6

| Example | Shell/Particle, Weight % | Properties | |
|---|---|---|---|
| | | 3 Mil CR | Scrub Cycles |
| 23 | 25 | 0.975 | 101 |
| 24 | 30 | 0.973 | 143 |
| 25 | 35 | 0.973 | 236 |
| 26 | 40 | 0.971 | 245 |
| 27 | 45 | 0.974 | 218 |
| 28 | 50 | 0.969 | 292 |

The results illustrate that the highest scrubs are obtained in a 35% to 50% shell to particle range while falling off in the region of 25%. The hiding characteristics of the paint remains essentially unchanged.

EXAMPLES 29-31

The procedure of Example 2 was used to produce core sizes ranging from 0.4 micron to 0.8 micron. These cores were encapsulated with 74% ethyl acrylate, 25% methyl methacrylate, and 1% methylacrylic acid according to the procedure of Example 3 and the shell made up 45% by weight of the particle. The particles were added to a control paint of the composition of Example 7 except that it contained 100 pounds titanium dioxide, 110.5 binder, UCAR 366 (100% solids basis) and 60 pounds of particles per 100 gallons. The paint was applied to a test surface and tested for 3 mil contrast ratios, K&N percent loss in reflectance and scrub values. The results are shown in Table 7.

TABLE 7

| Example | Core Size | 3 Mil | K&N Stain Reflectance Loss, % | Scrub Cycles |
|---|---|---|---|---|
| 29 | 0.4 micron | 0.967 | 35.0 | 380 |
| 30 | 0.6 micron | 0.971 | 40.3 | 250 |
| 31 | 0.8 micron | 0.976 | 40.3 | 200 |

The results show that hiding characteristics of paint are increased with increasing particle size while film integrity as measured by scrub resistance and loss of reflectance after applying the K-N Stain is inversely proportional to the particle size.

EXAMPLES 32-36

0.6 micron polystyrene cores of Example 2 are encapsulated according to the procedure of Example 3 in shell formulation consisting of ethyl methacrylate (EA), methyl methacrylate (MMA) and methacrylic acid (MMA) and in varying concentrations listed in Table 8 below. The shell to particle weight percent was 45%.

Different shell compositions varied the $T_g$ of the shell from $-2°$ C. to $+18°$ C. The particles produced were added to the control paint composition of Example 7 which was modified to contain 110 pounds of titanium dioxide, 110.5 pounds binder, UCAR-366 (100% solids basis); and 60 pounds particulates per 100 gallons. The paint was applied to a test surface and the surface was tested for 3 mil contrast ratios, K-N percent loss in reflectance, and scrub cycle values. The results are shown in Table 8.

TABLE 8

| Example | Shell Compositions | | | $T_g$ of Shell | Properties | | |
|---|---|---|---|---|---|---|---|
| | EA | MMA | MAA | | CR 3 Mil | Stain Loss | Scrub Cycles |
| 32 | 80 | 19 | 1 | $-2°$ C. | 0.972 | 40.8 | 213 |
| 33 | 75 | 25 | 0 | $+3°$ C. | 0.967 | 38.3 | 191 |
| 34 | 74 | 25 | 1 | $+4°$ C. | 0.976 | 41.1 | 215 |
| 35 | 70 | 29 | 1 | $+7°$ C. | 0.974 | 40.8 | 235 |
| 36 | 60 | 39 | 1 | $+18°$ C. | 0.971 | 38.6 | 201 |

EXAMPLES 37-48

0.6 micron styrene cores prepared according to procedure of Example 2 are encapsulated in the shell composed of 60% butyl acrylate and 40% methyl acrylate. according to the procedure of Example 3. The shell comprised 45% of the total weight of the particle. The particles are used with an intermediate quality control paint, the composition of which is listed in Table 9 below.

TABLE 9

| MATERIAL | lbs./100 gal. |
|---|---|
| A. Water | 426.8 |
| Thickener - Hydroxyethyl cellulose (Cellosize QP-4400 - Union Carbide) | 6.0 |
| Bacteriostatic preservative - 50% active; 5-hydroxymethoxymethyl D-1-939-3, 7-dioxabicycle (3.3.0) octane; 17.7% 5-hydroxymethyl-1-aza-3,7-dioxabicycle (3.3.0) octane; 7.8% 5-hydroxypoly [methyleneoxy (79% C$_3$, 4% C$_4$, 1% C$_5$] methyl-i-aza-3,7-dioabicycle (3.3.0) octanes Nuocept 95 (Tenneco) | 1.3 |
| B. Neutralizer 95% soln. of 2-amino-2 methyl-1-propanol (International Minerals & Chemical Corp.) AMP 95% | 1.5 |
| Dispersant - 25% sodium salt of polymeric carboxylic acid (Tamol 731 - Rohm & Haas) | 9.0 |
| Coalescer - Ethylene Glycol | 23.3 |
| Nonylphenoxypoly (ethyleneoxy) ethanol - Igepal CO-630 | 3.0 |
| Coalescing Aid - Mixed Alcohols (Texanol - Eastman) | 10.0 |
| Pigment - Titanox 2020 | 160.0 |
| Extender pigment - Silica Camelwite | 50.0 |
| Extender pigment - Duramite | 75.0 |
| Extender pigment - Goldbond R | 25.0 |
| Pigment - Calcium Carbonate - Optiwhite P | 125.0 |
| Defoamer (Diamond Shamrock) - Nopco NXZ | 1.0 |
| C. Extender pigment - Celite 281 | 25.0 |
| Binder - UCAR 366 (55%) | 200.2 |
| Water | 16.7 |
| Defoamer (Diamond Shamrock) - Nopco NXZ | 2.0 |

Portions of titanium dioxide and binder contained in Example 37 are removed and replaced by particles prepared above. Paint formulation for each Example was applied to a substrate and the substrate tested for 3 mil contrast ratios, K-N percent, loss in reflectance and scrub cycle values and the results are shown in Table 10 below. Example 37 is considered the control paint to which Examples 38 through 48 are compared.

TABLE 10

| | Pounds/100 Gallons | | | | K&N Stain | Scrub |
|---|---|---|---|---|---|---|
| Example | TiO$_2$ | UCAR | Opac. | 3 mil CR | Loss % | Cycles |
| 37 | 160 | 110 | 0 | 0.970 | 31 | 134 |
| 38 | 110 | 75 | 35 | 0.968 | 35.2 | 90 |
| 39 | 110 | 80 | 35 | 0.963 | 37.0 | 112 |
| 40 | 110 | 80 | 40 | 0.964 | 37.2 | 118 |
| 41 | 120 | 70 | 40 | 0.968 | 38.9 | 95 |
| 42 | 120 | 75 | 35 | 0.969 | 38.5 | 91 |
| 43 | 120 | 80 | 30 | 0.970 | 36.7 | 103 |
| 44 | 115 | 80 | 40 | 0.956 | 34.6 | 146 |
| 45 | 115 | 90 | 30 | 0.957 | 32.6 | 159 |
| 46 | 115 | 90 | 25 | 0.957 | 33.5 | 131 |
| 47 | 120 | 80 | 35 | 0.965 | 32.9 | 111 |
| 48 | 120 | 90 | 25 | 0.966 | 32.6 | 131 |

The weight of the binder plus the weight of the particles was approximately equal to the weight of the binder used in Example 37 which is absent particles of this invention. The opacity results indicated that optimized formulations of Examples 38–48 were equal to the formulation without particles, Example 37. The film properties were likewise close to or within the range of Example 37. The best combination of properties in Example 48 which essentially matches control formulation for both film properties and hiding efficiencies despite the fact that the weight of the particles used was half the sum of the weight of the titanium dioxide and binder withdrawn.

We claim:

1. A latex coating composition of improved opacity and film characteristics, said coating composition comprising discrete capsules comprising a solid polymeric core surrounded by a solid polymeric shell having a $T_g$ less than about 45° C., wherein the weight ratio of said shell to the total weight of said capsule ranges from 0.25:1 to 0.5:1.

2. An aqueous latex dispersion paint composition which forms at ambient temperatures into a hardened paint film, said latex paint having about 40% to 70% by weight total solids comprising on a dry solids weight basis:
   a. 10–25% of a film forming latex binder;
   b. 2–25% of an opacifying organic particle comprising discrete capsules comprising a solid polymeric core surrounded by a solid polymeric shell having a $T_g$ less than about 45° C., wherein the weight ratio of said shell to the total weight of particle ranges from 0.25:1 to 0.5:1;
   c. 15 to 40% opacifying pigment having a refractive index of at least about 1.8;
   d. 0 to 70% of extender pigment having refractive index below about 1.5.

3. An aqueous latex dispersion paint composition which forms at ambient temperatures into a hardened paint film, said paint film having opacity and film characteristics substantially equivalent to a first film formed from a first composition containing pigment and binder wherein x is weight in pounds of said pigment in said first composition, y is weight in pounds of said binder in said first composition, said paint composition containing pigment, binder and an opacifying organic particle comprising discrete capsules comprising a solid polymeric core surrounded by a solid polymeric shell having a $T_g$ less than about 45° C., the weight ratio of said shell to the total weight of said capsule ranges from 0.25:1 to 0.5:1, wherein x' is the weight difference in pounds of the pigment between said first composition and said paint composition, y' is the weight difference in pounds of the binder between said first composition and said paint composition and z is the weight in pounds of said particles in said paint composition, x' ranges from about 0.1x to about 0.5x; y' ranges from about 0.1y to about 0.6y; and z ranges from about 0.3(x'+y') to about 0.9(x'+y').

4. The composition of claim 1, 2 or 3 wherein said cores range in diameter from about 0.3 to about 1.0 micron.

5. The composition of claim 4 wherein said cores range in diameter from about 0.4 to about 0.8 micron.

6. The composition of claim 5 wherein said shell to said capsule weight ratio ranges from 0.4:1 to 0.45:1.

7. The composition of claim 1, 2 or 3 wherein said core is formed of polymeric material having a $T_g$ greater than about 80° C. and said shell is formed of a uncrosslinked polymeric material having a $T_g$ less than 45° C.

8. The composition of claim 7 wherein the $T_g$ material of said core ranges from 80° C. to about 120° C.

9. The composition of claim 7 wherein the material of said shell has a $T_g$ ranging from −45° C. to +30° C.

10. The composition of claim 1, 2 or 3 wherein said material of said core is selected from a group consisting of methyl methacrylate, vinyl chloride, acrylonitrile and polystyrene.

11. The composition of claim 10 wherein said material of said core comprises polystyrene.

12. The composition of claim 1, 2 or 3 wherein the material in said shell is selected from a group consisting of copolymers of acrylate, methyl acrylate, styrene and vinyl acetate.

13. The composition of claim 1, 2 or 3 wherein the particles are monodisperse.

14. The composition of claim 1, 2 or 3 wherein said composition forms a film upon drying, said film contains voids and said voids ranges from about 0.2 to about 0.5 micron in diameter.

15. The composition of claim 1, 2 or 3 wherein said core is formed of a crosslinked polymeric material having a $T_g$ greater than about 70° C.

16. The composition of claim 3 wherein said x' ranges from about 0.2x to about 0.4x, y' ranges from 0.2y to about 0.4y, and z is about $0.5(x'+y')$.

* * * * *

REEXAMINATION CERTIFICATE (1297th)
United States Patent [19]

Herman et al.

[11] B1 4,391,928

[45] Certificate Issued Jun. 5, 1990

[54] OPACIFYING POLYMERIC PARTICLES AND USES

[75] Inventors: Daniel F. Herman, Princeton; Uno Kruse, East Windsor, both of N.J.

[73] Assignee: NL Chemicals, Inc., New York, N.Y.

Reexamination Request:
No. 90/001,621, Oct. 17, 1988

Reexamination Certificate for:
Patent No.: 4,391,928
Issued: Jul. 5, 1983
Appl. No.: 299,360
Filed: Sep. 4, 1981

[51] Int. Cl.$^5$ .................................. C09D 7/12
[52] U.S. Cl. ........................... 523/201; 525/902
[58] Field of Search ................................ 523/201

[56] References Cited

U.S. PATENT DOCUMENTS

| | | |
|---|---|---|
| 3,657,172 | 4/1972 | Gallagher et al. ................ 523/201 |
| 3,839,064 | 9/1972 | Vincent . |
| 3,949,138 | 9/1974 | Heiser . |
| 4,058,434 | 8/1976 | Vincent et al. . |
| 4,156,669 | 4/1978 | Lee . |
| 4,226,752 | 10/1980 | Erickson et al. . |
| 4,277,384 | 7/1981 | Arkins ................................ 525/902 |
| 4,468,498 | 2/1982 | Kowalski et al. . |

FOREIGN PATENT DOCUMENTS 54-151606  11/1979  Japan .

OTHER PUBLICATIONS

Woods et al, *Journal of Paint Technology*, vol. 40, pp. 541-548 (1968).

Ono et al, *Colloid and Polymer Science*, vol. 253, pp. 744-749 (1975).

*Primary Examiner*—Edward J. Smith

[57] ABSTRACT

Opacifying and film-forming particles consisting of discrete capsules, each having a solid polymeric shell and a solid polymeric core and having a weight ratio of shell to capsule ranging from 0.25:1 to 0.5:1. The capsules are capable of providing a high degree of opacity and good film integrity in paint compositions in replacement for pigments in binding agents.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 3 and 16 is confirmed.

Claims 1 and 4 are determined to be patentable as amended.

Claims 5-15 dependent on an amended claim, are determined to be patentable.

1. [A latex coating] *An aqueous latex dispersion paint* composition *which forms at ambient temperatures into a hardened paint film* of improved opacity and film characteristics, said [coating] composition comprising discrete capsules comprising a solid polymeric core *having a diameter of from about 0.4 to about 1.0 micron* surrounded by a solid polymeric shell having a Tg less than about 45° C., wherein the weight ratio of said shell to the total weight of said capsule ranges from 0.25:1 to 0.5:1.

4. The composition of claim [1,] 2, or 3 wherein said cores range in diameter from about 0.3 to about 1.0 micron.

* * * * *